United States Patent [19]
Sugimoto et al.

[11] Patent Number: 6,039,138
[45] Date of Patent: Mar. 21, 2000

[54] FOUR-WHEEL DRIVE VEHICLE WITH FREE WHEELS

[75] Inventors: Takashi Sugimoto; Kazuhiro Honaga, both of Shizuoka-ken, Japan

[73] Assignee: Suzuki Motor Corporation, Shizuoka-ken, Japan

[21] Appl. No.: 09/044,465

[22] Filed: Mar. 19, 1998

[30] Foreign Application Priority Data

Mar. 31, 1997 [JP] Japan .................................. 9-096743

[51] Int. Cl.⁷ .................................................. B60K 17/344
[52] U.S. Cl. ...................................... 180/245; 192/69.41
[58] Field of Search ................................. 180/233, 245, 180/246; 192/69.4, 69.41

[56] References Cited

U.S. PATENT DOCUMENTS

| | | | |
|---|---|---|---|
| 5,056,634 | 10/1991 | Shiba et al. | 192/40 |
| 5,413,201 | 5/1995 | Vidal | 192/69.41 |
| 5,871,072 | 2/1999 | Itoh et al. | 192/69.41 |

FOREIGN PATENT DOCUMENTS

| | | |
|---|---|---|
| 62-1641 | 1/1987 | Japan . |
| 2-117426 | 5/1990 | Japan . |

*Primary Examiner*—Kevin Hurley
*Attorney, Agent, or Firm*—Flynn, Thiel, Boutell & Tanis, P.C.

[57] ABSTRACT

A four-wheel drive vehicle with free wheels having free wheel hub mechanisms which utilize intake pipe negative pressure which is kept from being in the negative pressure state for a long time to diminish loading of the sealing members and improve the durability of the free wheel hub mechanisms. In the free wheel hub mechanism, a negative pressure change-over valve is disposed in an intake pipe negative pressure introducing passage to not only open or close the passage but also open it to the atmosphere. A timer is also provided to operate the negative pressure change-over valve so that the negative pressure introducing passage is opened to the atmosphere after lapse of a certain time from when a transfer switches over to two- or four-wheel drive until when the intake pipe negative pressure becomes constant.

12 Claims, 14 Drawing Sheets

//www.w3.org/TR/REC-html40/loose.dtd">
FOUR-WHEEL DRIVE VEHICLE WITH FREE WHEELS

FIELD OF THE INVENTION

The present invention relates to a four-wheel drive vehicle with free wheels. Particularly, the invention is concerned with a four-wheel drive vehicle with free wheels capable of improving the durability of a free wheel hub mechanism.

BACKGROUND OF THE INVENTION

There is known a four-wheel drive vehicle (4WD vehicle) including an engine, a transmission, and a transfer case provided with a 2–4 switching mechanism for switch-over between two-wheel drive (2WD) and four-wheel drive (4WD), and wherein a free wheel hub mechanism for making each of the driven-side wheels free by an intake pipe negative pressure in a two-wheel drive condition of the transfer case is disposed between each of the driven-side wheels and a driven-side axle. In a two-wheel drive condition, the free wheel hub mechanism disengages a driven-side wheel from the driven-side axle and makes it free to prevent a wasteful traveling resistance based on rotation of the driven-side wheel; while in a four-wheel drive condition, the free wheel hub mechanism causes the driven-side wheel and the driven-side axle to be locked with each other, thereby allowing the driving force from the engine to be transmitted to the driven-side wheel.

More particularly, as shown in FIG. 13, in a four-wheel drive vehicle 702 there are mounted an engine 704, a transmission 706, and a transfer case 712 having a transfer lever 708 and a 2–4 switching mechanism 710. A rear drive shaft 714 as a driving-side drive shaft and a front drive shaft 716 as a driven-side drive shaft are connected to the transfer case 712.

The rear drive shaft 714 connects to a rear differential 718 as a driving-side differential. A rear axle 722 as a driving-side axle with rear wheels 720 as driving-side wheels connected thereto is connected through the rear differential 718.

The front drive shaft 716 connects to a front differential 724 as a driven-side differential. A front axle 728 as a driven-side axle with front wheels 726 as driven-side wheels connected thereto is connected through the front differential 724. Between right and left front axles 728 and right and left front wheels 726 are provided right and left free wheel hub mechanisms 730 respectively.

As shown in FIG. 14, each free wheel hub mechanism 730 is disposed between the associated front axle 728 and a wheel hub 732 of the associated front wheel 726.

According to the construction of the free wheel hub mechanism 730, a spindle or sleeve 734 and bearings 736 are disposed between the wheel hub 732 and the front axle 728. Within a hub housing 738 attached to the wheel hub 732 are formed a two-wheel drive-side negative pressure chamber 742 and a four-wheel drive-side negative pressure chamber 744 separated by means of a diaphragm 740. Further, within the hub housing 738 is mounted an outer gear 746, and a slide gear 748 connected to the diaphragm 740 and adapted to slide on the front axle 728. Two- and four-wheel drive-side negative pressure ports 750, 752 are formed in the spindle 734. The two-wheel drive-side negative pressure port 750 and the two-wheel drive-side negative pressure chamber 742 are in communication with each other through a two-wheel drive-side negative pressure path which is constituted by first, second and third negative pressure paths 754, 756, 758 connected in series. The four-wheel drive-side negative pressure port 752 and the four-wheel drive-side negative pressure chamber 744 are in communication with each other through a four-wheel drive-side negative pressure path which is constituted by first, second and third negative pressure paths 760, 762, 764 connected in series.

Further, for maintaining the negative pressure paths in the free wheel hub mechanism 730 in a hermetically sealed condition, a first sealing member 766 is provided which seals the two- and four-wheel drive-side negative pressure chambers 742, 744. Likewise, a second sealing member 768 is provided for sealing the two-wheel drive-side negative pressure chamber 742 against the atmosphere, and a third sealing member 770 is provided for sealing the four-wheel drive-side negative pressure chamber 744 against the atmosphere.

In the free wheel hub mechanism 730, as shown in FIG. 14, an intake pipe negative pressure acts on the two-wheel drive-side negative pressure chamber 742 in a two-wheel drive condition, whereby the slide gear 748 is disengaged from the outer gear 746 to render the wheel hub 732 free with respect to the front axle 728. In contrast, in a four-wheel drive condition, as shown in FIG. 15, an intake pipe negative pressure is exerted on the four-wheel drive-side negative pressure chamber 744, whereby the slide gear 748 is brought into mesh with the outer gear 746 to lock the wheel hub 732 with respect to the front axle 728.

In an axle lock type two- to four-wheel drive, as shown in FIG. 16, an intake manifold 806 having an intake passage 804 formed therein is connected to an engine 802, a throttle valve 808 is mounted in the intake passage 804, two- and four-wheel drive-side negative pressure introducing passages 810, 812 are formed communication wise in the intake passage 804 on a downstream side of the throttle valve 808, a two-wheel drive-side diaphragm mechanism 814 is mounted in the two-wheel drive-side negative pressure introducing passage 810, an axle unlocking valve 816 is disposed at an intermediate position in the two-wheel drive-side negative pressure introducing passage 810, and a four-wheel drive-side diaphragm mechanism 818 is mounted in the passage 812. Further, an axle unlocking valve 820 is mounted at an intermediate position in the passage 812, an axle 822 is connected to the two- and four-wheel drive-side diaphragm mechanisms 814, 818 respectively, and an axle lock detecting switch 824 is attached to the axle 822 for detecting a four-wheel drive condition on the basis of operation of the axle 822.

The axle unlocking valve 816, axle locking valve 820 and axle lock detecting switch 824 are connected to a control means 826 which is a four-wheel drive controller, as shown in FIG. 17. Also connected to the control means 826 are a transfer switch 830, an indicator lamp 832 mounted within the passenger compartment of the vehicle, and a battery 834. The transfer switch 830, which is connected to a transfer lever 828, turns ON upon detecting a four-wheel drive shift position of the transfer lever 828.

According to this construction, as shown in FIG. 18, a shift operation of the transfer lever 828 to four-wheel drive causes a switch over from two- to four-wheel drive, and when the transfer switch 830 turns from OFF to ON (indicated at position "a"), the control means 826 detects the ON condition of the transfer switch 830, turns ON the axle locking valve 820 to introduce the intake pipe negative pressure and causes the four-wheel drive-side diaphragm mechanism 818 to operate, thereby locking the axle 822. Then, when the axle lock detecting switch 824 detects the locked position, it turns OFF the axle locking valve 820 to stop the operation of the valve and lights the indicator lamp 832 (indicated at position "b").

In contrast, upon switch-over from four- to two-wheel drive, the control means 826 detects an ON-to-OFF switch-over of the transfer switch 830 (indicated at position "c"), then turns ON the axle unlocking valve 816 to introduce the intake pipe negative pressure and operates the two-wheel drive-side diaphragm mechanism 814, allowing the axle 822 to operate. Further, after switch-over from ON to OFF of the axle lock detecting switch 824, the control means 826 turns OFF the indicator 832 (indicated at position "d") and also turns OFF the axle unlocking valve 816 to stop the operation of the valve (indicated at position "e").

Free wheel hub mechanisms of the type described above are described, for example, in Japanese Patent Laid-open Nos. 62-1641 and 2-117426.

According to the free wheel hub mechanism described in No. 62-1641, in an automotive two- and four-wheel drive switching system having a transfer clutch, there is provided a drive means which causes the transfer clutch to be engaged in interlock with engine stop, thereby allowing the switch-over from two- to four-wheel drive to be done automatically in interlock with engine stop so that even when the outside air temperature drops in a cold region for example, resulting in freezing of an actuator which actuates the transfer clutch into an engaged or released state, the vehicle can be ensured to be in four-wheel drive.

According to the free wheel hub mechanism described in the No. 2-117426, in a four-wheel drive vehicle having a free wheel switch for switch-over between engaged state and disengaged state of a free wheel mechanism, there is provided a lock means for locking the free wheel mechanism in its engaged state irrespective of the free wheel mechanism disengaging operation of the free wheel switch, thereby allowing the free wheel mechanism to be kept in its engaged state even upon turning OFF of the free wheel switch as long as the vehicle is running in a four-wheel drive condition. For example, the engaged operative condition of the free wheel mechanism is locked continually irrespective of an operational condition of the free wheel switch which is remotely operated. Even if a free wheel mechanism disengaging operation should be done erroneously by the free wheel switch during the vehicle running in the four-wheel drive condition, an actual disengaging operation is prevented.

In a conventional four-wheel drive vehicle with free wheels, however, if the negative pressure path in the free wheel hub mechanism is kept negative in pressure for a long time in order to maintain the locked state which is the four-wheel drive state or the free state which is the two-wheel drive state, the sealing member as a boundary member to the exterior (i.e. atmosphere) can fail and cause entry of muddy water or the like, with the result that the function and durability of the free wheel hub mechanism is deteriorated.

In the axle lock type two- to four-wheel drive as shown in FIGS. 16–18, since the detection of the axle position in the four-wheel drive condition is performed mechanically by the axle lock detecting switch, there is the inconvenience that a switch actuating component is needed. Additionally, since the axles rotate, it is difficult to use a mechanical switch.

SUMMARY OF THE INVENTION

According to a preferred embodiment of the present invention, in order to eliminate the above-mentioned inconveniences, in a four-wheel drive vehicle with free wheels wherein a transfer case having a 2–4 switching mechanism for switch-over between two-wheel drive and four-wheel drive is provided, and a free wheel hub mechanism for making each of driven-side wheels free by an intake pipe negative pressure in a two-wheel drive condition is disposed between each of the driven-side wheels and a driven-side axle, the free wheel hub mechanism is provided with a plurality of sealing members for maintaining a negative pressure path in a hermetically sealed condition, there is provided an improvement characterized in that in a negative pressure introducing passage for introducing the intake pipe negative pressure into the free wheel hub mechanism there is disposed a negative pressure change-over valve for opening and closing the negative pressure introducing passage and for causing the negative pressure introducing passage to be open to the atmosphere, and a timer is provided to operate the negative pressure change-over valve in such a manner that the negative pressure introducing passage is opened to the atmosphere after the lapse of a certain time from when the transfer case switches over to two- or four-wheel drive until when the intake pipe negative pressure becomes constant.

In a preferred embodiment of the present invention, an intake pipe negative pressure is exerted on a negative pressure path in a free wheel hub mechanism for only a short time at the time of change-over to two- or four-wheel drive, so that it is possible to reduce the burden on the sealing members, reduce the possibility of occurrence of such problems as the entry of muddy water, and to improve the durability of the free wheel hub mechanism while maintaining the function thereof in a satisfactory condition.

In addition, since it is not necessary to mechanically detect the two- or four-wheel drive condition, a switch actuating component is not needed, and cost can be reduced. The invention is also applicable to a structure that is incapable of detecting a signal due to the rotation of a component.

DETAILED DESCRIPTION

Embodiments of the present invention will be described concretely in detail hereinunder with reference to the accompanying drawings, in which FIGS. 1 to 8 illustrate a first embodiment of the present invention.

Figure 8:
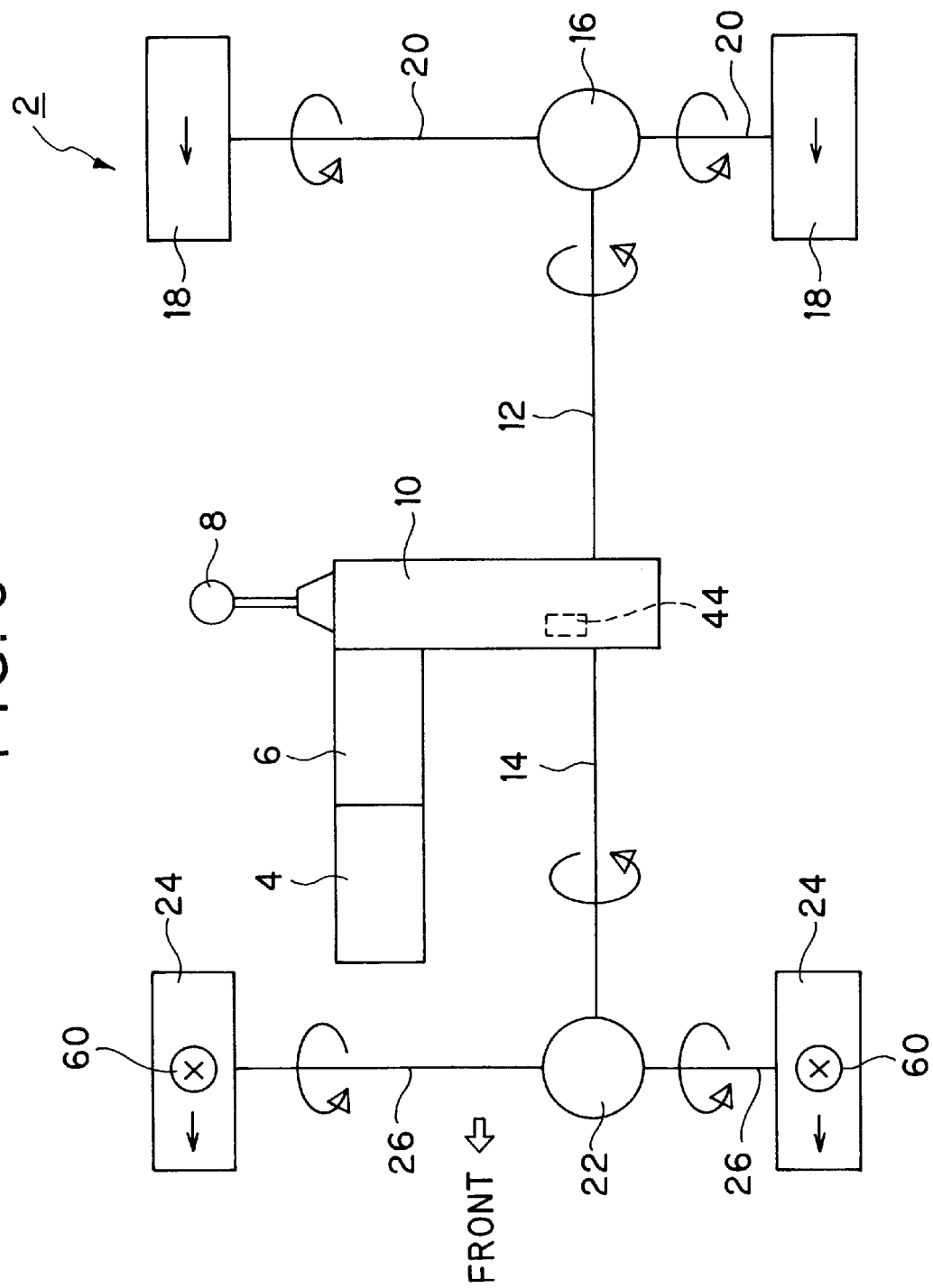
FIG. 8 is a diagrammatic view of the four-wheel drive vehicle.

In FIG. 8, the numeral 2 denotes a four-wheel drive vehicle (4WD vehicle). The four-wheel drive vehicle 2 is provided with an engine 4, a transmission 6, and a transfer case 10 having a transfer lever 8. To the transfer case 10 are connected a rear drive shaft 12 which is a driving-side drive shaft and a front drive shaft 14 which a driven-side drive shaft.

The rear drive shaft 12 connected to a rear differential 16 as a driving-side differential. To the rear differential 16 are connected rear axles 20 as driving-side axles with rear wheels 18 as driving-side wheels connected thereto.

The front drive shaft 14 connects to a front differential 22 as a driven-side differential. Connected to the front differential 22 are front axles 26 as driven-side axles with front wheels 24 as driven-side wheels connected thereto.

Figure 7:
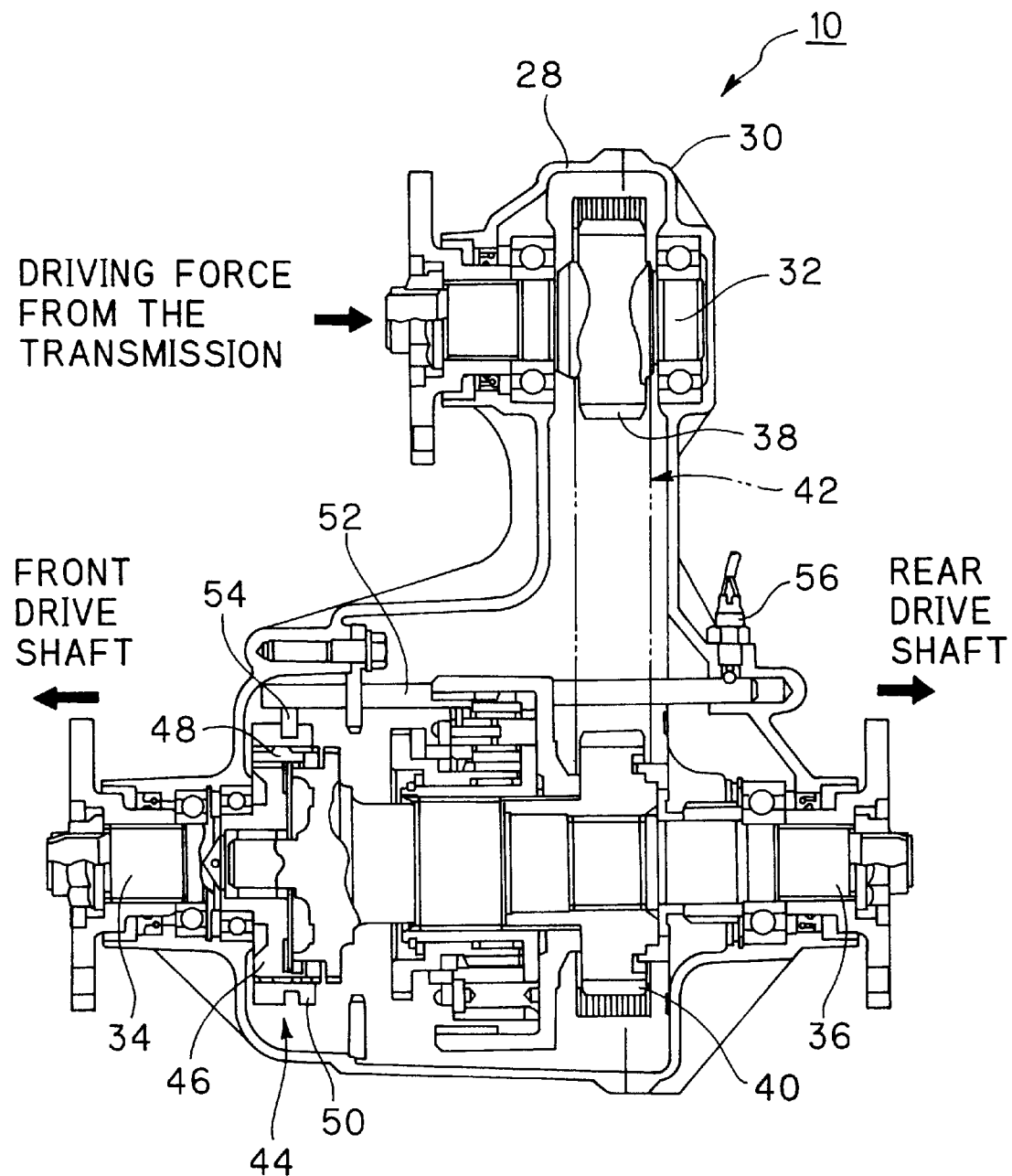
FIG. 7 is a sectional view of a transfer case.

As shown in FIG. 7, the transfer case 10 distributes the driving force from the transmission 6 to both rear drive shaft 12 and front drive shaft 14. The transfer case 10 has an input shaft 32, a front output shaft 34 and a rear output shaft 36, which are supported rotatably by first and second transfer housings 28 and 30. The input shaft 32 and the rear output shaft 36 are connected together through a chain 42, which is engaged with an input-side sprocket 38 mounted on the input shaft 32 and an output-side sprocket 40 mounted on the rear output shaft 36. The front output shaft 34 and the rear output shaft 36 are connected and disconnected by means of a 2–4 switching mechanism 44 which is a synchromesh mechanism. The 2–4 switching mechanism 44 is of the same structure as the conventional synchronizing mechanism mounted in the transmission for example. It has a hub 46, a key 48 and a sleeve 50. A shift fork 54 fixed to a shift shaft 52 is engaged with the sleeve 50. In the second housing 30 there is provided a position detecting switch 56 for detecting a four-wheel drive position in accordance with the operation of the shift shaft 52.

The front output shaft 34 is connected to the front drive shaft 14, while the rear output shaft 36 is connected to the rear drive shaft 12.

Figure 5:
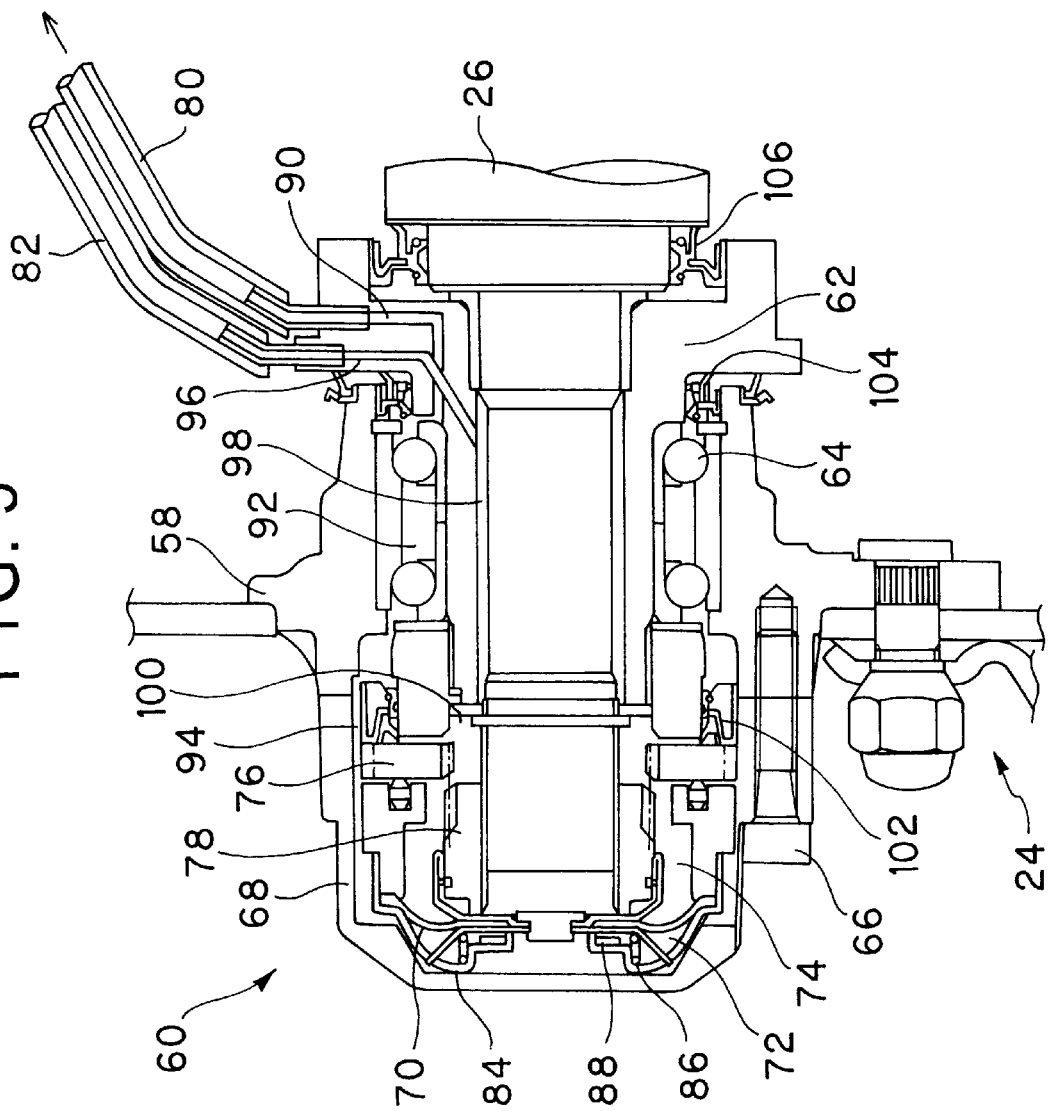
FIG. 5 is a sectional view of a free wheel hub mechanism in a two-wheel drive condition.
Figure 6:
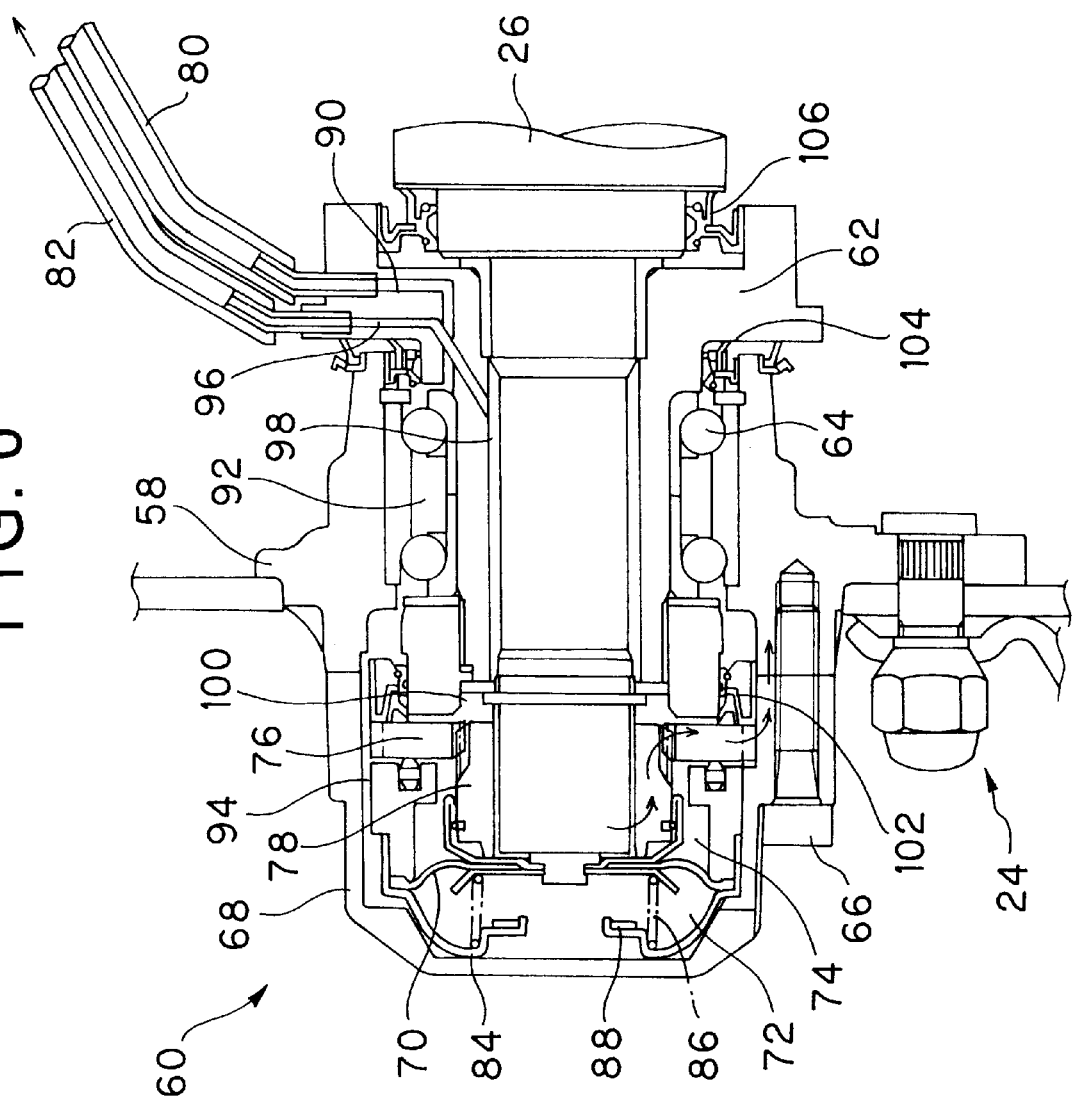
FIG. 6 is a sectional view of the free wheel hub mechanism in a four-wheel drive condition.

As shown in FIGS. 5 and 8, free wheel hub mechanisms 60 are provided respectively between the right and left front axles 26 and wheel hubs 58 of the right and left front wheels 24.

In the free wheel hub mechanism 60, as shown in FIG. 5, a spindle 62 and a bearing 64 are disposed between the wheel hub 58 of each front wheel 24 and the associated front axle 26. A two-wheel drive-side negative pressure chamber 72 and a four-wheel drive-side negative pressure chamber 74 are formed by a diaphragm 70 within a hub housing 68 which is attached to the wheel hub 58 with mounting bolts 66. Within the hub housing 68 there is disposed an outer gear 76 and a slide gear 78 which is adapted to slide on the front axle 26 in connection with the diaphragm 70. Two- and four-wheel drive-side negative pressure ports 80, 82 are formed in the spindle 62.

The diaphragm 70 is urged by a spring 86 which is held by a stationary member 84 fixed within the hub housing 68, and is connected for rotative sliding motion to the slide gear 78. A magnet 88 is attached to the stationary member 84. The two-wheel drive-side negative pressure port 80 and the two-wheel drive-side negative pressure chamber 72 are in communication with each other through first, second and third negative pressure paths 90, 92, 94 which are connected in series. The four-wheel drive-side negative pressure port 82 and the four-wheel drive-side negative pressure chamber 74 are in communication with each other through first, second and third negative pressure paths 96, 98, 100 which are also connected in series.

For ensuring a hermetically sealed condition of the negative pressure path in the free wheel hub mechanism 60, a first sealing member 102 is provided which seals both two- and four-wheel drive-side negative pressure chambers 72, 74. Likewise, a second sealing member 104 is provided for sealing the two-wheel drive-side negative pressure chamber 72 against the atmosphere, and a third sealing member 106 is provided for sealing the four-wheel drive-side negative pressure chamber 74 against the atmosphere.

Figure 4:
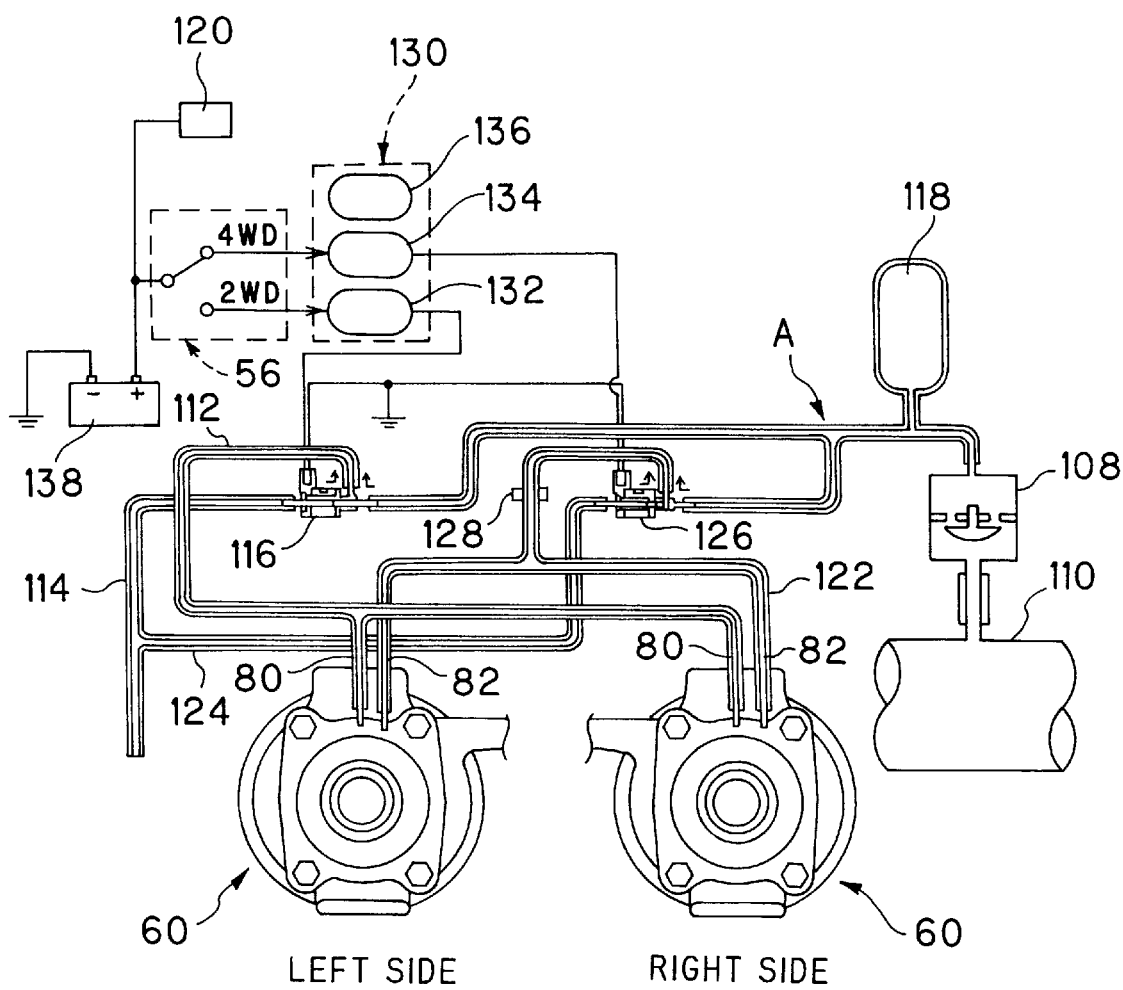
FIG. 4 is a construction diagram of the drive switching system.

As shown in FIG. 4, a two-wheel drive-side negative pressure introducing passage 112 and a negative pressure introducing passage A are in communication with the two-wheel drive-side negative pressure port 80. The negative pressure introducing passage A also communicates with an intake manifold 110 of the engine 4 through a check valve 108. In intermediate portions of the negative pressure introducing passage A are mounted a two-wheel drive-side negative pressure change-over valve 116 and a negative pressure tank 118 located on the check valve 108 side. The negative pressure change-over valve 116 not only opens and closes the two-wheel drive-side negative pressure introducing passage 112 but also opens the same passage to the atmosphere through passage 114.

The four-wheel drive vehicle 2 is provided with an indicator lamp 120 within the passenger compartment of the vehicle to inform the driver of the four-wheel drive condition.

The negative pressure introducing passage A and a four-wheel drive-side negative pressure introducing passage 122 are in communication with the four-wheel drive-side negative pressure port 82. In an intermediate portion of the passage 122 is mounted a four-wheel drive-side negative pressure change-over valve 126 which not only opens and closes the passage 122 but also opens the same passage to the atmosphere through the passage 124. On the free wheel hub mechanism 60 side relative to the change-over valve 126, there is disposed a vacuum switch (negative pressure sensor) 128. The vacuum switch 128 turns ON when the intake pipe negative pressure has reached a certain value or higher, and detects the four-wheel drive condition.

The two-wheel drive-side negative pressure change-over valve 116 is connected to a first timer 132 of a timer means 130, while the four-wheel drive-side negative pressure change-over valve 126 is connected to a second timer 134 of the timer means 130. The timer means 130 is further provided with an overall timer 136. The position detecting switch 56 provided in the transfer 10 is connected to the timer means 130. To the position detecting switch 56 is connected a battery 138.

The timer means 130 operates the two-wheel drive-side negative pressure change-over valve 116 or the four-wheel drive-side negative pressure change-over valve 126 so that the two-wheel drive-side negative pressure introducing passage 112 or the four-wheel drive-side negative pressure introducing passage 122 are opened to the atmosphere after the lapse of a certain time from when the transfer case 10 switches over to two- or four-wheel drive until when the intake pipe negative pressure becomes constant.

The timer means 130 operates the four-wheel drive-side negative pressure change-over valve 126 so that the four-wheel drive-side negative pressure introducing passage 122 is opened to the atmosphere through passage 124 after the negative pressure sensor 128 disposed in the passage 122 has detected a certain or higher intake pipe negative pressure over a period of a certain time. The timer means 130 further operates the change-over valve 126 so that when the negative pressure sensor 128 does not operate for a certain time, the passage 122 is opened to the atmosphere after the lapse of the certain time.

Therefore, in the free wheel hub mechanism 60, the position detecting switch 56 (FIG. 7) operates upon shifting operation of the transfer lever 8 from two- to four-wheel drive or from four- to two-wheel drive. Then, the two- or four-wheel drive-side negative pressure change-over valve 116 or 126 on the detected position side is operated for a certain time by the timer means 130 to conduct the intake pipe negative pressure to either the two- or four-wheel drive-side negative pressure port 80 or 82 respectively, while the other negative pressure port is opened to the atmosphere. With this pressure difference, the slide gear 78 is engaged with or disengaged from the outer gear 76. In the two-wheel drive condition (FIG. 5), the slide gear 78 engaged with the front axle 26 is held at the bottom portion of the hub housing 68 by means of the magnet 88. In this state, the slide gear 78 is disengaged from the outer gear 76 which rotates integrally with the wheel hub 58 through the hub housing 68, while the slide gear is nonrotatably coupled to the front axle 26.

In the four-wheel drive condition (FIG. 6), the intake pipe negative pressure is conducted to the four-wheel drive-side negative pressure port 82 by shifting the transfer lever 8 to the four-wheel drive side. By the diaphragm 70 the slide gear 78 is allowed to slide into mesh with the outer gear 76 and assumes a locked state. After the slide gear 78 has meshed with the outer gear 76, the four-wheel drive-side negative pressure change-over valve 126 is turned OFF by the first timer 134 (on the 4WD side) of the timer means 130, thereby causing the four-wheel drive-side negative pressure port 82 to be opened to the atmosphere, and the slide gear 78 is urged by the spring 86 to maintain the locked state (i.e. four-wheel drive condition).

In the transfer case 10, with the vehicle running in the two-wheel drive condition, the front output shaft 34, front drive shaft 14, front differential 22 and front axles 26 are at rest and the driving force from the transmission 6 is transmitted through the rear output shaft 36 to the rear drive shaft 12 and rear differential 16 to drive only the rear wheels 18. In contrast, when the transfer lever 8 is shifted from two- to four-wheel drive, the front output shaft 34 which previously was stopped is raised up to the same number of revolutions as that of the rear output shaft 36 by operation of the 2–4 switching mechanism 44. In this state, the rotations of the front drive shaft 14, front differential 22 and front axles 26 correspond to the vehicular speed.

Now, the operation of this first embodiment will be described below with reference to the flow charts of FIGS. 1 to 3.

Figure 1:
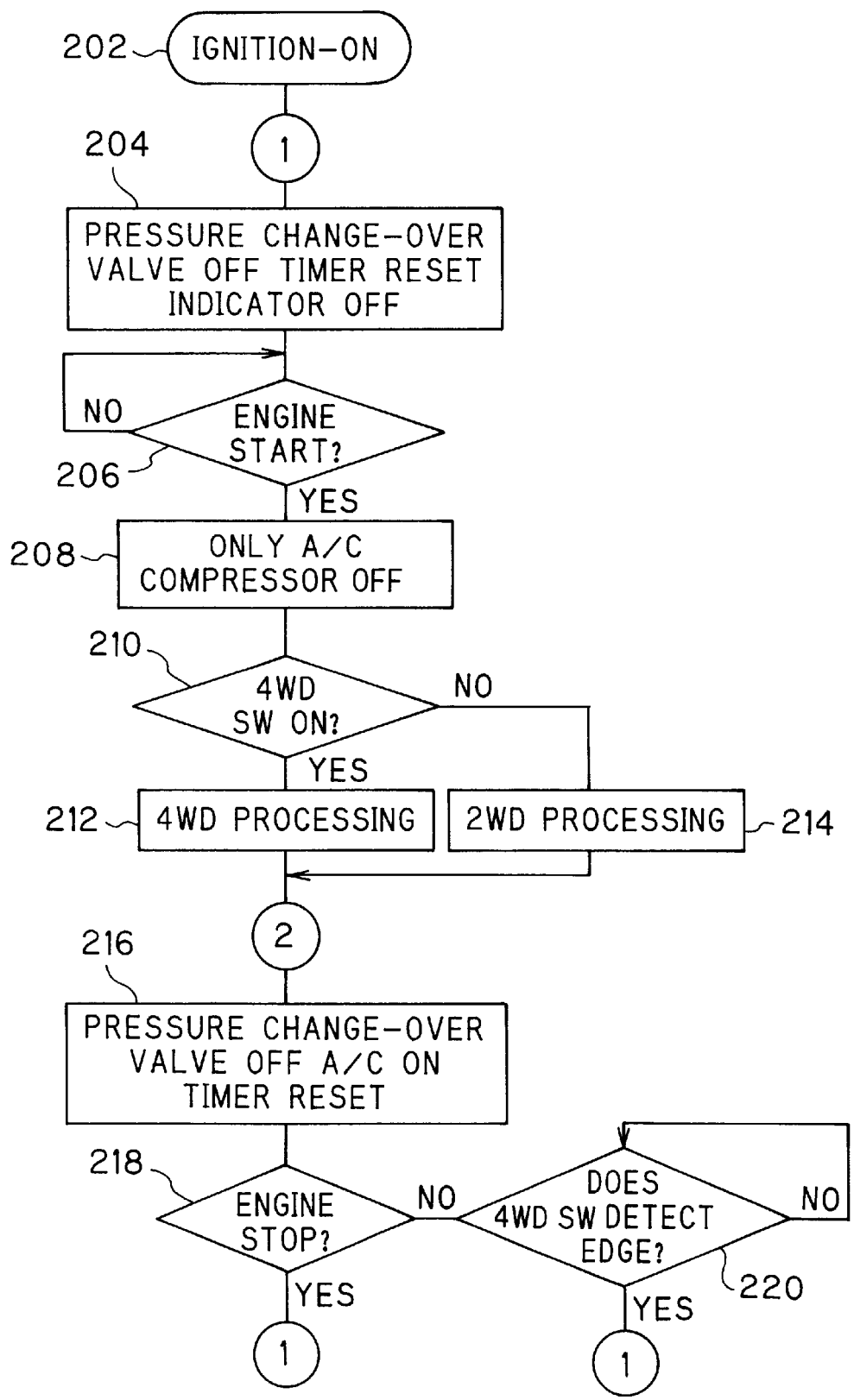
FIG. 1 is a flow chart of a drive switching system for a vehicle that switches between two-wheel drive and four-wheel drive.

In FIG. 1, upon turning ON of an ignition key (not shown) (step 202), the two- and four-wheel drive-side negative pressure change-over valves 116 and 126 are turned OFF, the timer means 130 is reset, and the indicator lamp 120 is turned OFF, (step 204).

Then, it is determined whether the engine 4 has started or not (step 206). It is determined that the engine 4 has started when the engine speed is approximately 500 rpm or more in a four-cycle engine or approximately 375 rpm or more in a three-cycle engine. When the engine 4 has started and the answer in step 206 is affirmative, only the compressor of an air conditioner (A/C) is turned OFF (step 208). Then, it is determined whether the position detecting switch 56 is ON or not (hereinafter referred to as the detection of "edge"), that is, it is judged whether the drive condition is four-wheel drive or not (step 210). If the answer in step 210 is affirmative, there is performed a four-wheel drive (4WD) processing (step 212).

Figure 2:
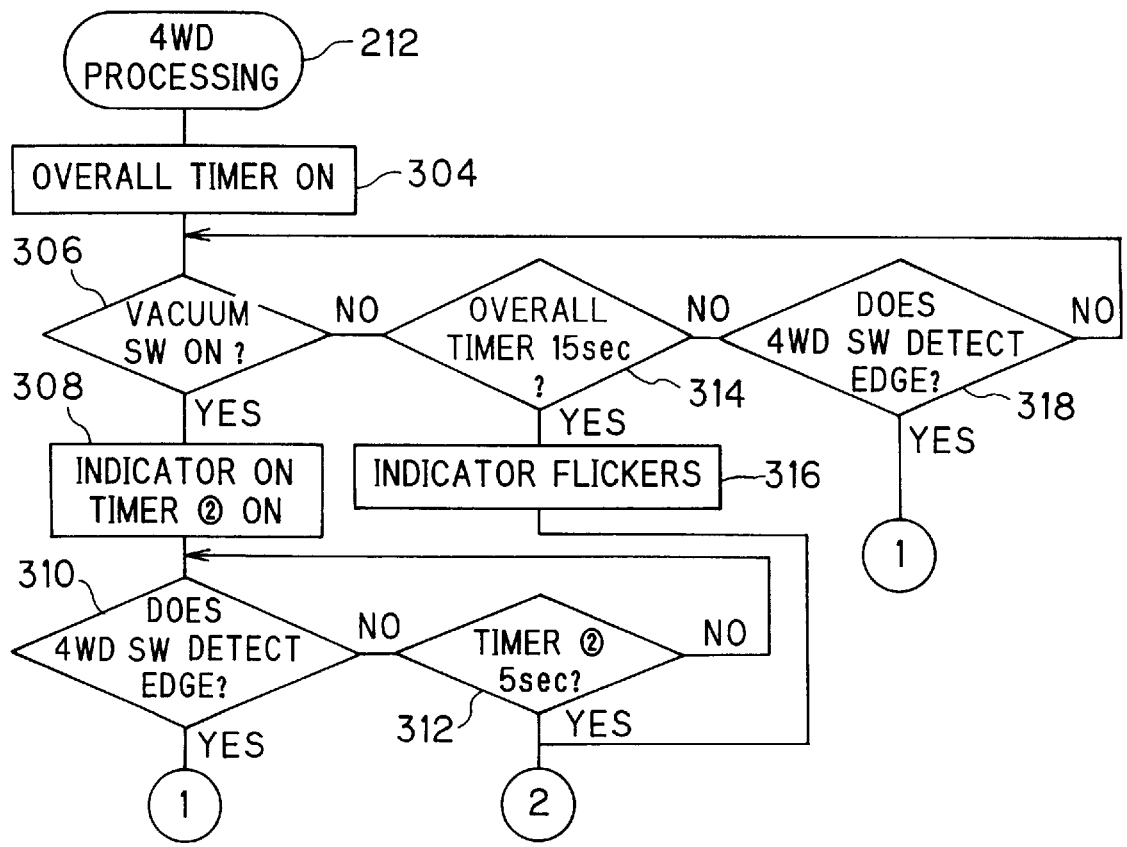
FIG. 2 is a flow chart showing the drive switching system in a four-wheel drive mode.

In the four-wheel drive processing (step 212), as shown in FIG. 2, the overall timer 136 is turned ON by the position detecting switch 56 (step 304) and a determination is made as to whether the vacuum switch 128 is ON or not (step 306). When the answer in step 306 is affirmative, both indicator lamp 120 and second timer 134 are turned ON (step 308).

Then, it is determined whether the position detecting switch 56 is detecting an edge or not (step 310).

If the answer in step 310 is affirmative, the flow is returned to step 204 in FIG. 1. Otherwise, if the answer in step 310 is negative, it is determined whether the second timer 134 has operated for a certain time, for example, approximately 5 seconds, corresponding to the duration of a certain or higher intake pipe negative pressure (step 312). If the answer in step 312 is affirmative, the flow advances to step 216 in FIG. 1, while if it is negative, the flow is returned to step 310.

If the answer is negative in step 306, it is determined whether the overall timer 136 has arrived at a count corresponding to a certain time, for example, approximately 15 seconds (step 314). If the answer is affirmative in step 314, the indicator lamp 120 is turned ON (step 316) and the flow is advanced to step 216 in FIG. 1. If the answer is negative in step 314, it is determined whether the position detecting switch 56 has detected an edge or not (step 318).

If the answer is affirmative in step 318, the flow is returned to step 204 in FIG. 1, while if it is negative, the flow is returned to step 306.

If the answer is negative in step 210 in FIG. 1, there is performed a two-wheel drive processing (step 214).

Figure 3:
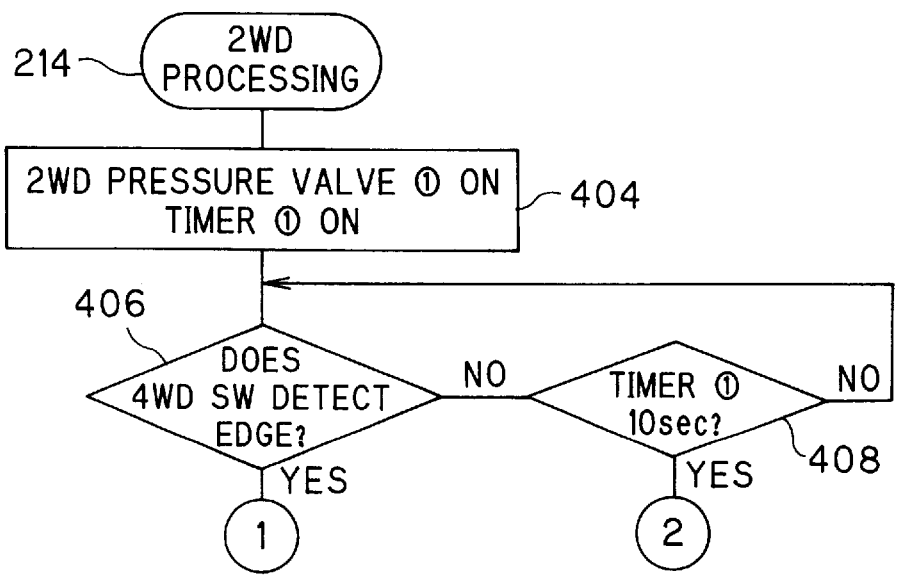
FIG. 3 is a flow chart showing the drive switching system in a two-wheel drive mode.

In the two-wheel drive processing (step 244), as shown in FIG. 3, the two-wheel drive-side negative pressure change-over valve 116 is turned ON and the first timer 132 also turned ON (step 404), and it is judged whether the position detecting switch 56 is detecting an edge or not (step 406).

If the answer is affirmative in step 406, the flow is returned to step 204 in FIG. 1. On the other hand, if the answer is negative in step 406, it is determined whether the first timer 132 has arrived at a count corresponding to a certain time, for example, approximately 10 seconds (step 408). If the answer is affirmative in step 408, the flow advances to step 216 in FIG. 1, while if it is negative, the flow is returned to step 406.

After completion of the two- and four-wheel drive processings, the two- and four-wheel drive-side negative pressure change-over valves 116, 126 are turned OFF, the compressor of the air conditioner is turned ON, and the timer means 130 is reset, in FIG. 1 (step 216).

Then, it is determined whether the engine 2 has stopped or not (step 218). If the answer is affirmative in step 218, the flow is returned to step 204, while if it is negative, it is determined whether the position detecting switch 56 is detecting an edge or not (step 220). If the answer is affirmative is step 220, the flow is returned to step 204, while if it is negative, this determination is continued.

To be more specific, and referring to FIGS. 4, 5 and 8, at the time of switch-over from two- to four-wheel drive, the transfer lever 8 is shifted to the four-wheel drive side, with the result that the overall timer 136 is operated for a certain time, for example, approximately 15 seconds, by the position detecting switch 56, and at the same time the four-wheel drive-side negative pressure change-over valve 126 is operated to open the four-wheel drive-side negative pressure introducing passage 122 in order to introduce the intake pipe negative pressure into the four-wheel drive-side negative pressure chamber 74. Then, when a certain or higher intake pipe negative pressure (such an intake pipe negative pressure as ensures the slide gear 78 to be meshed with the outer gear 76 by the diaphragm 70) is reached during operation of the overall timer 136 (set to, approximately 15 seconds), the indicator lamp 120 is turned ON and the second timer 134 operates (approximately 5 seconds), then after the 5 seconds, the four-wheel drive-side negative pressure change-over valve 126 is operated, causing the four-wheel drive-side negative pressure introducing passage 122 to be opened to the atmosphere. In contrast, if the certain or higher intake pipe negative pressure is not reached during operation of the overall timer 136 (approximately 15 seconds), it is determined that a problem has occurred in a negative pressure path, and the indicator lamp 120 is allowed to flicker.

For switch-over from four- to two-wheel drive, the transfer lever 8 is shifted to the two-wheel drive side, resulting in that the first timer 132 is operated (approximately 10 seconds) by the position detecting switch 56, and the two-wheel drive-side negative pressure change-over valve 116 is operated in its opening direction for only, approximately 10 seconds in order to introduce the intake pipe negative pressure into the two-wheel drive-side negative pressure chamber 72, then after the 10 seconds, the two-wheel drive-side negative pressure introducing passage 112 is opened to the atmosphere.

In the present invention, the intake pipe negative pressure is not exerted for a lengthy time on the negative pressure paths in the free wheel hub mechanism 60. In particular, there no longer occurs the entry of muddy water through the second and third sealing members 104 and 106. Thus, it is possible to maintain the function of the free wheel hub mechanism 60 in a satisfactory condition and improve the durability thereof.

Moreover, since the timer means 130 is provided with the overall timer 136, the indicator lamp 120 can be allowed to flicker, issuing a warning single, and hence it is possible to easily let the driver know the switched-over condition.

Further, since the 2–4 switching mechanism 44 as a synchromesh mechanism is provided in the transfer case 10, the front drive shaft 14 and the front differential 16 which are not rotating in the two-wheel drive condition are synchronized up to the number of revolutions corresponding to the vehicle speed and thereafter a shift is made to the four-wheel drive mode. Thus, even if the four-wheel drive vehicle 2 is not stopped at every switch-over to four-wheel drive, a shift to two- or four-wheel drive can be done while the vehicle is moving. Additionally, by interlocking the switch-over operation of the free wheel hub mechanism 60 operated by the intake pipe negative pressure with the two-/four-wheel drive switch-over operation in the transfer case 10, it becomes possible to easily effect the switch-over operation of the free wheel hub mechanism 60.

FIGS. 9 to 12 illustrate a second embodiment of the present invention. In the second embodiment, the elements which correspond to those of the above first embodiment are indicated by the same reference numerals as in the first embodiment to omit further explanations thereof.

Figure 10:
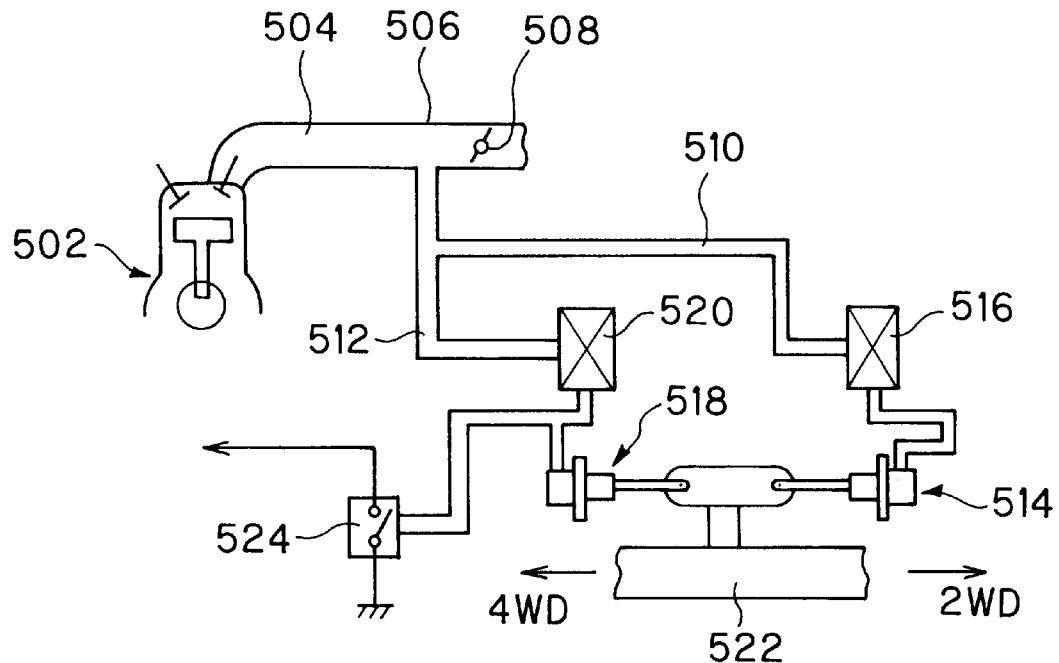
FIG. 10 is a partial construction diagram of the drive switching system of the second embodiment.
Figure 11:
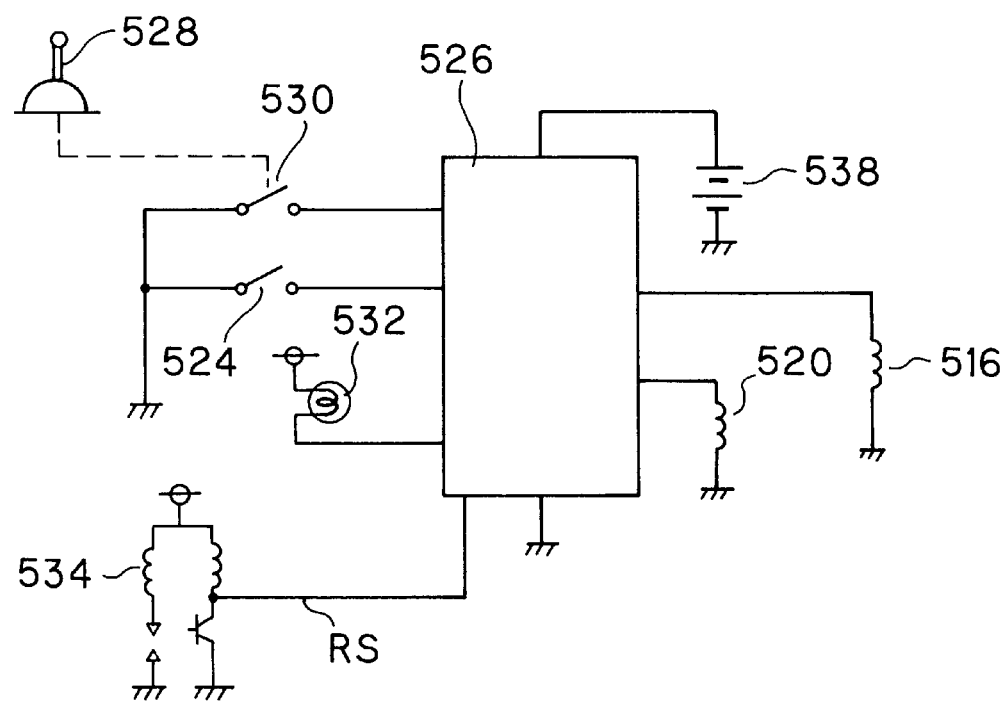
FIG. 11 is an electrical circuit diagram of the second drive switching embodiment.
Figure 12:
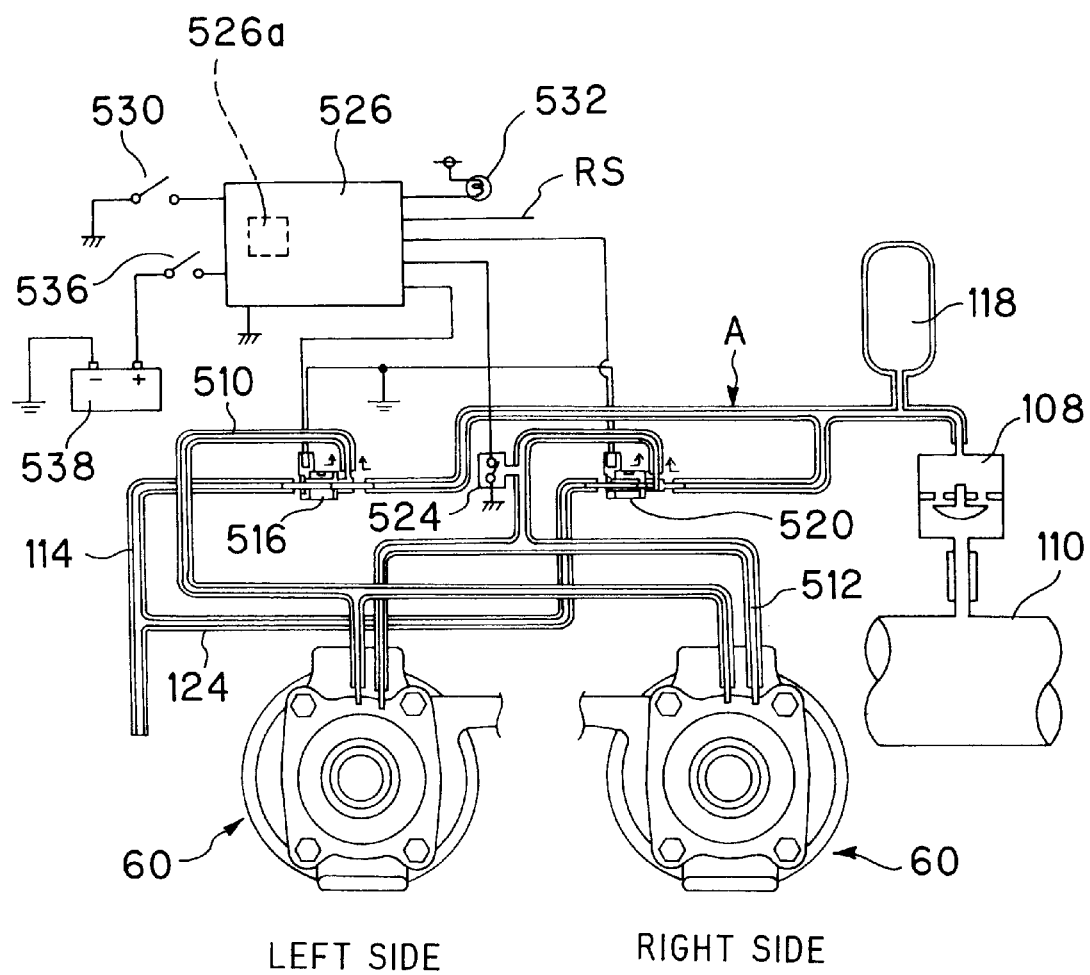
FIG. 12 is a construction diagram of the second drive switching embodiment.
Figure 13:
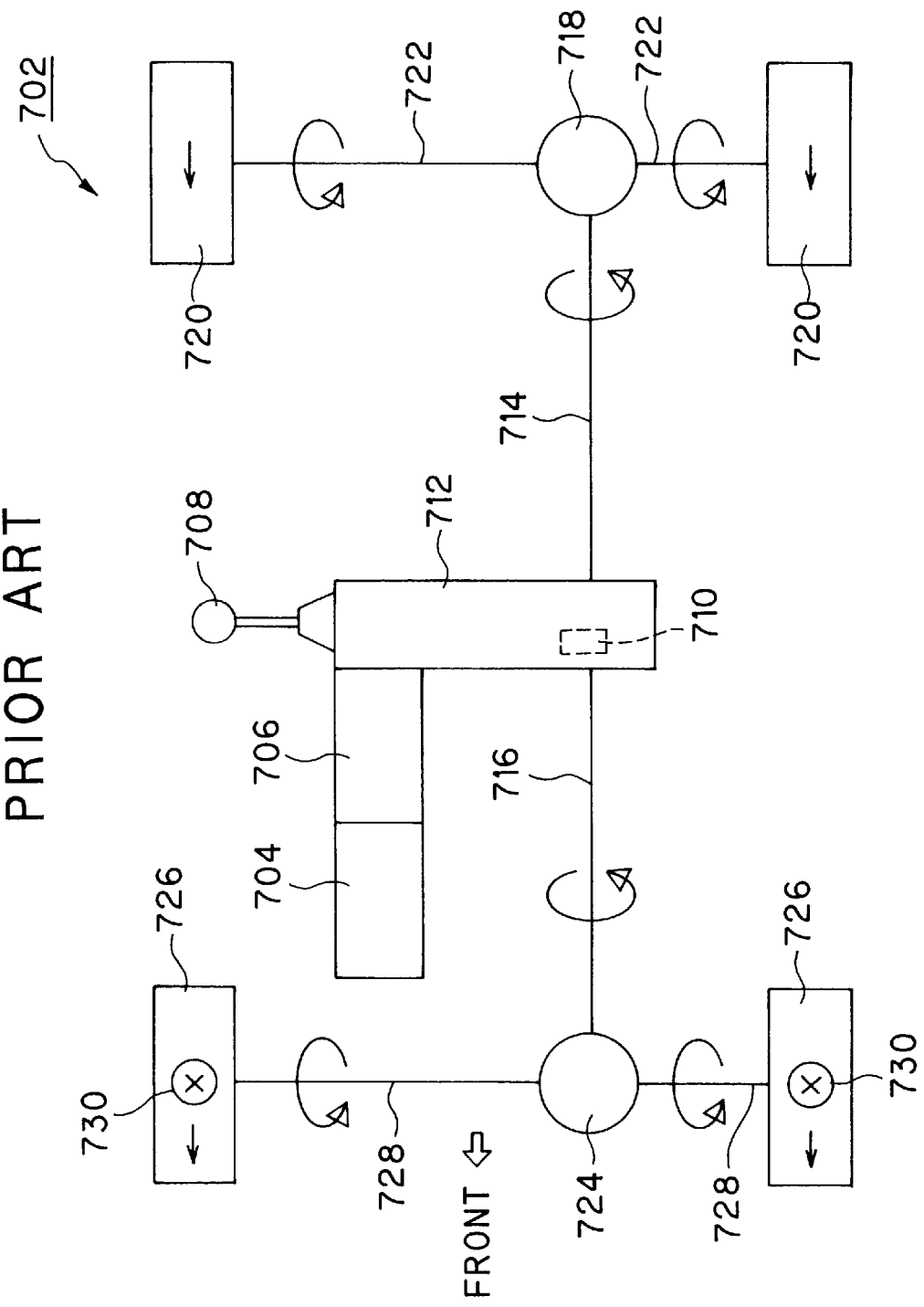
FIG. 13 is a diagrammatic view of a conventional two- to four-wheel drive vehicle.
Figure 14:
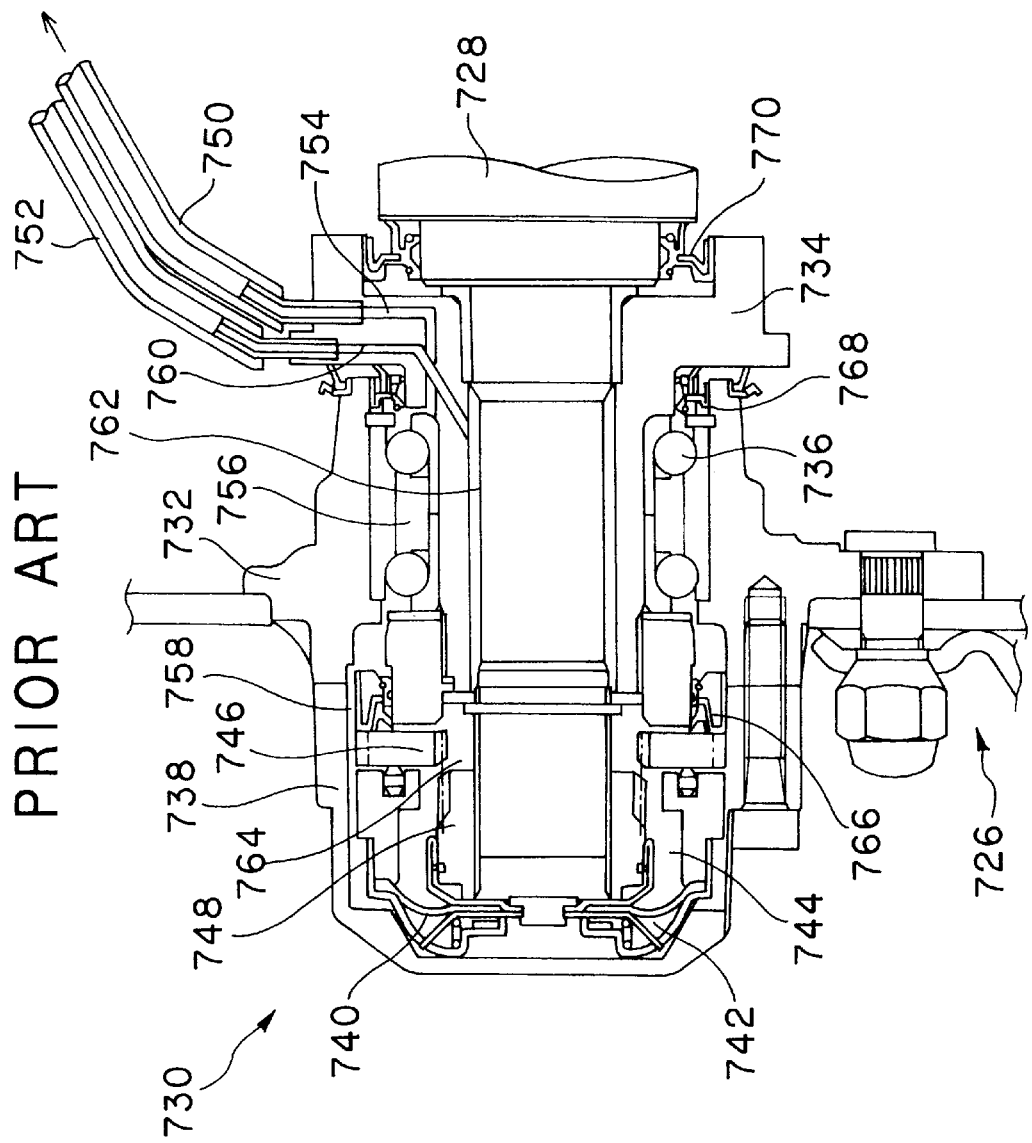
FIG. 14 is a sectional view of a conventional free wheel hub mechanism in a two-wheel drive condition.
Figure 15:
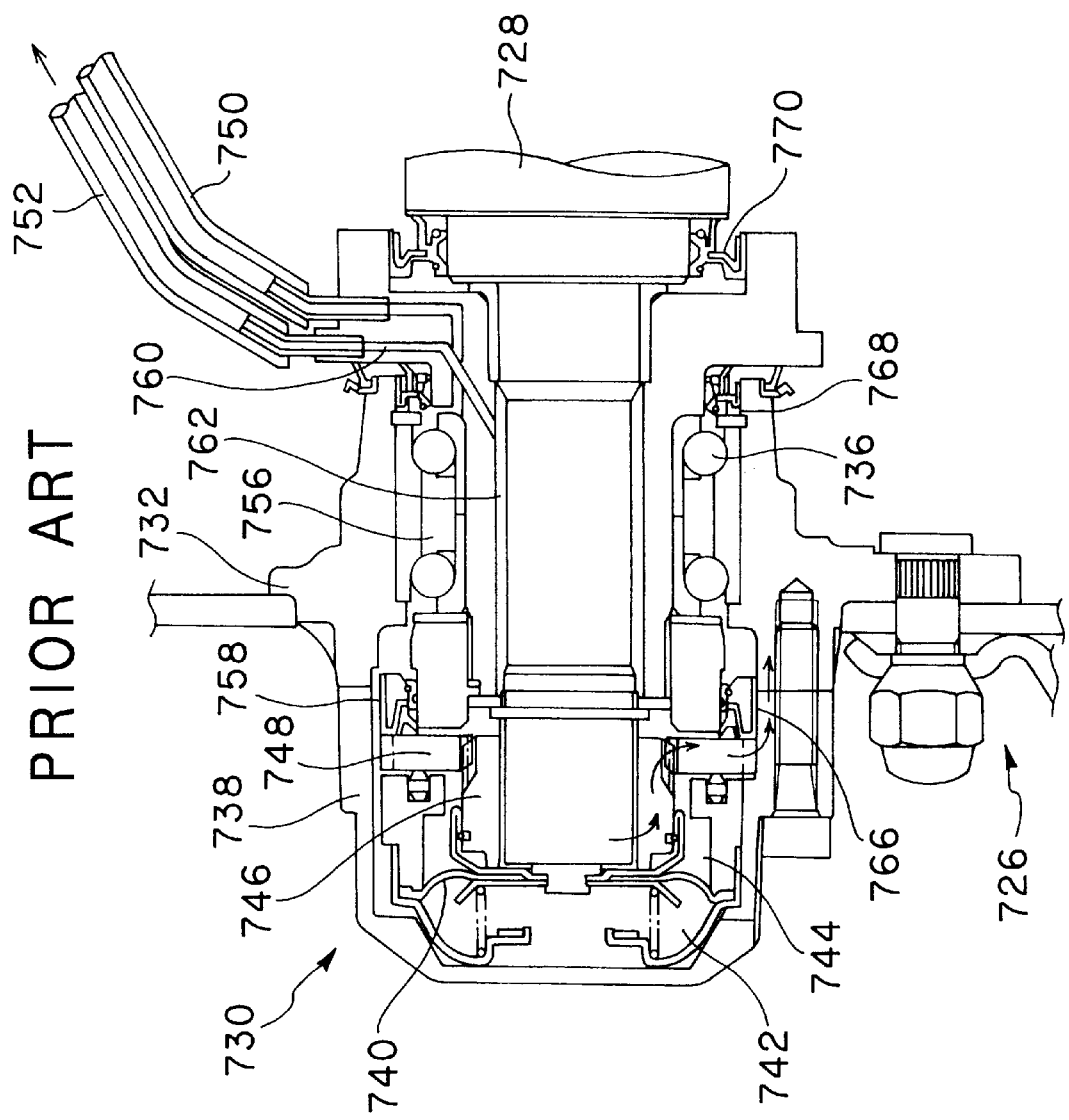
FIG. 15 is a sectional view of the conventional free wheel hub mechanism in a four-wheel drive condition.
Figure 16:
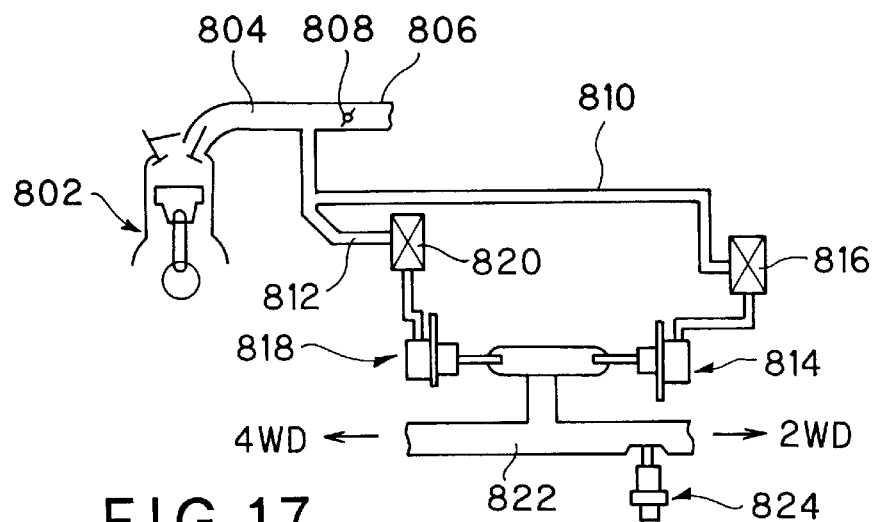
FIG. 16 is a construction diagram of a conventional axle locking system for a two- to four-wheel drive.
Figure 17:
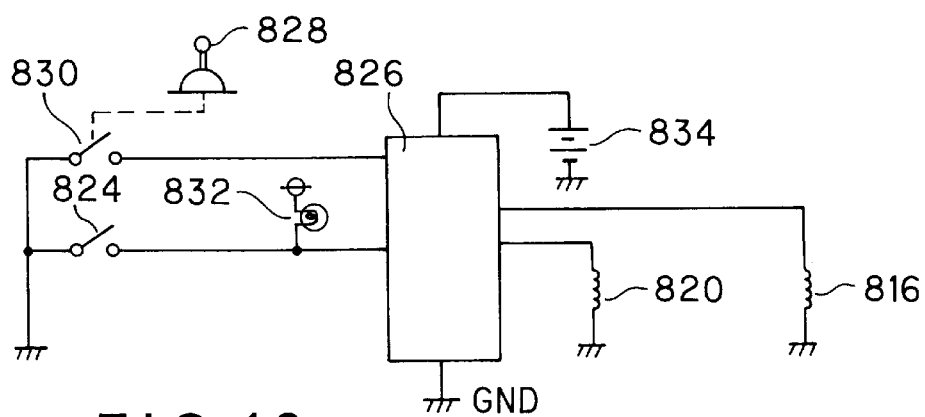
FIG. 17 is an electrical circuit diagram of the conventional axle locking system of FIG. 16.
Figure 18:
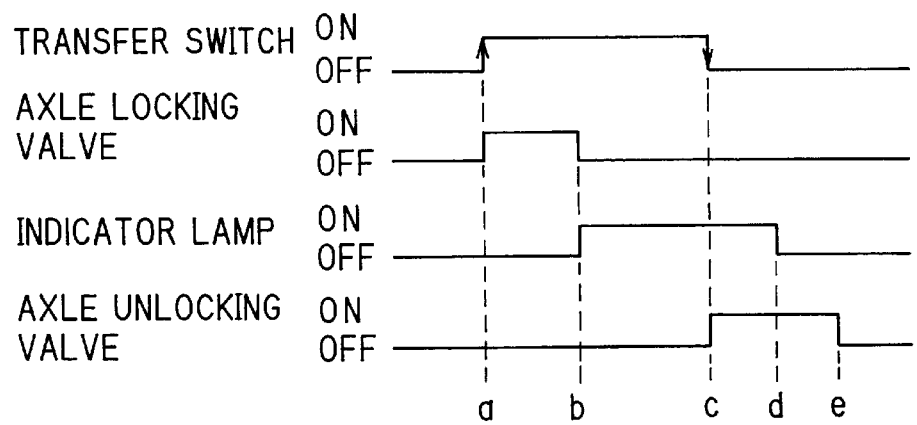
FIG. 18 is a time chart of the conventional axle locking system of FIG. 16.

This second embodiment is characterized by the following: In an axle lock system, as shown in FIGS. 10 to 12, an intake manifold 506 with an intake passage 504 formed therein is attached to an engine 502, and a throttle valve 508 is mounted in the intake passage 504. Further, two- and four-wheel drive-side negative pressure introducing passages 510, 512 are formed downstream of the throttle valve 508 and in communication with the intake passage 504, and a two-wheel drive-side diaphragm mechanism 514 is mounted in the two-wheel drive-side negative pressure introducing passage 510. An axle unlocking valve 516 is mounted in an intermediate position of the passage 510, a four-wheel drive-side diaphragm mechanism 518 is mounted in the four-wheel drive-side negative pressure introducing passage 512, and an axle locking valve 520 is mounted in an intermediate position of the four-wheel drive-side negative pressure introducing passage 512. The two- and four-wheel drive-side diaphragm mechanisms 514, 518 are in communication with an axle 522.

A vacuum switch 524 is provided in the four-wheel drive-side negative pressure introducing passage 512 at a position between the axle locking valve 520 and the four-wheel drive-side diaphragm mechanism 518.

As shown in FIGS. 11 and 12, the axle unlocking valve 516, axle locking valve 520 and vacuum switch 524 are connected to a control means 526 which is a four-wheel drive controller.

Further connected to the control means 526 are a transfer switch 530 connected to a transfer lever 528, an indicator lamp 532 mounted within the passenger compartment of the vehicle, an ignition coil 534 which outputs a rotation signal, an ignition switch 536, and a battery 538. The control means 526 has a timer 526a for operating the two- or four-wheel drive-side negative pressure change-over valves 516 or 520 in such a manner that the two- or four-wheel drive-side negative pressure introducing passage 510 or 512 is opened to the atmosphere after the lapse of a certain time from when the transfer case 10 switches over to two- or four-wheel drive until when the intake pipe negative pressure becomes constant. Further, the control means 526 detects two- or four-wheel drive of the transfer case 10 just after start-up of the engine 502 and performs an initial operation.

Figure 9:
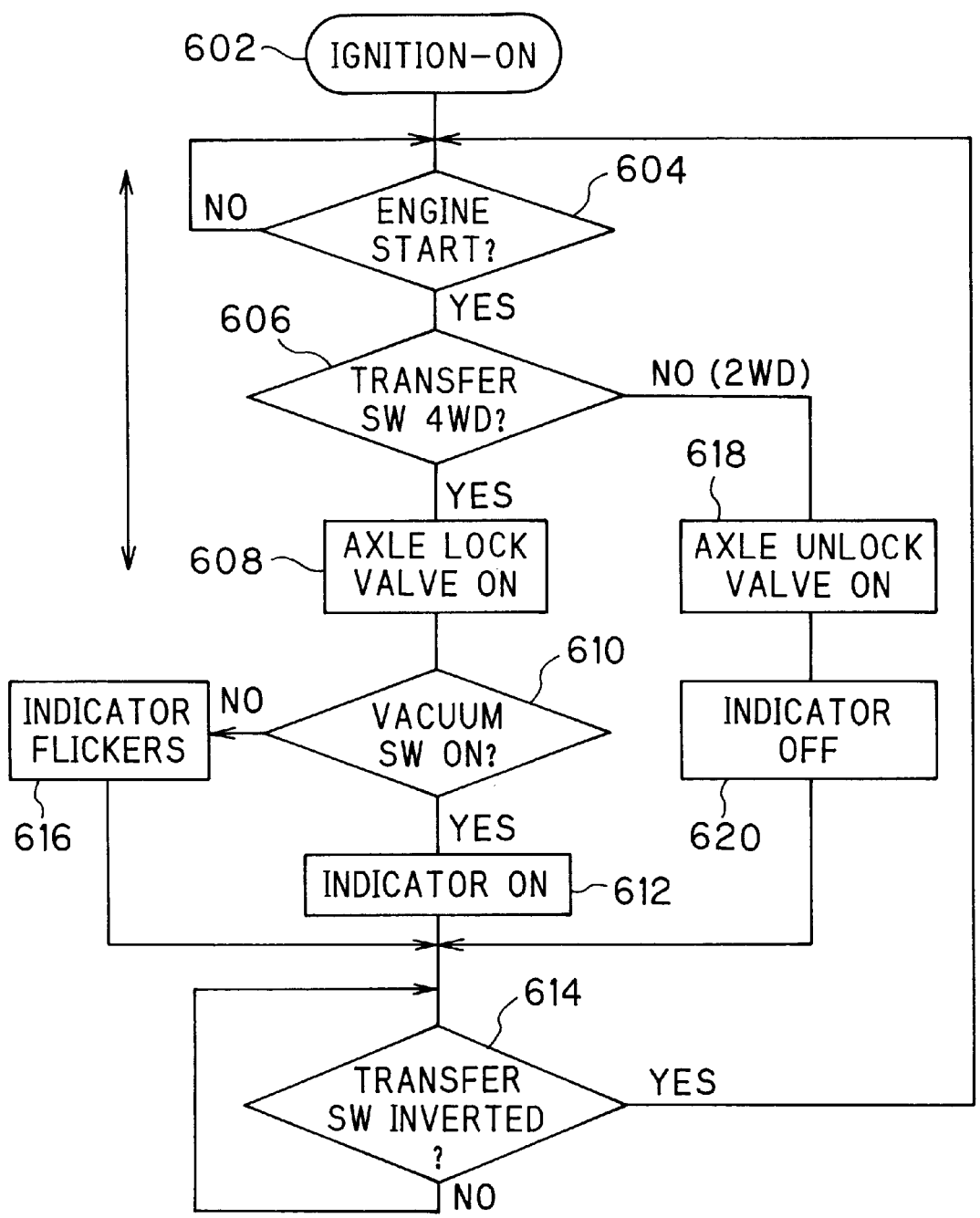
FIG. 9 is a flow chart of a drive switching system according to a second embodiment of the present invention.

The operation of this second embodiment will be described below with reference to the flow chart of FIG. 9.

Upon turning ON of the ignition switch 536 (step 602), it is determined whether the engine 502 has started or not (step 604). If the answer is affirmative in step 604, it is determined whether the transfer switch 530 is ON (4WD) or not (step 606).

If the answer is affirmative in step 606, the axle locking valve 520 is turned ON (step 608) and it is determined whether the vacuum switch 524 is ON or not (step 610). Thus, from step 604 to step 608 in FIG. 9, there is performed an initial operation at start-up of the engine 502.

If the answer is affirmative in step 610, the indicator lamp 532 is turned ON (step 612) and it is determined whether the transfer switch 530 has been inverted or not (step 614). If the answer is affirmative in step 614, the flow is returned to step 604. If the answer is negative in step 610, the indicator lamp 532 is allowed to flicker (step 616), urging the driver to repeat the operation, and the flow is shifted to step 614.

If the answer is negative in step 606, the drive condition is two-wheel drive, so the axle unlocking valve 516 is turned ON (step 618) and the indicator lamp 532 is turned OFF (step 620).

As a result, it becomes possible to detect the four-wheel drive condition of each rotating wheel hub 58, and since the vacuum switch 524 is disposed on only the operating side of the axle locking valve 520 located on the four-wheel drive side, a reduction in cost can be attained. In addition, the mode of providing a four-wheel drive indication despite two-wheel drive is eliminated.

The detection of the position of the axle 522 is not mechanical, so for fixing the position of the axle 522 in the four- or two-wheel drive condition upon application of power to the control means 526, the axle 522 is set initially according to the position of the transfer switch 530 at the time of start-up of the engine 502. Since the operation of the free wheel hub mechanism 60 relies on the intake pipe negative pressure, even if the control means 526 operates with the ignition switch 536 turned ON, no operating force is generated prior to start-up of the engine 502. Further, according to the structure described above, it is impossible to detect four- and two-wheel drive conditions of the free wheel hub mechanism 60 (because each valve turns OFF upon lapse of a certain time). For example, when the transfer lever 528 is shifted after stop of the engine 502, there easily occurs the case where the four- or two-wheel drive condition in the free wheel hub mechanism 60 and that in the transfer case 10 do not match each other. In the second embodiment, however, as an initializing operation, start-up of the engine 502 is detected and the free wheel hub mechanism 60 is sure to be operated according to the position of the transfer lever 528 to prevent the occurrence of unmatching between the position of the transfer lever 528 and that of the free wheel hub mechanism 60.

Additionally, the use of the vacuum switch 524 eliminates the need of using a complicated component for mechanically detecting a switch-over to four-wheel drive.

According to the present invention, as is apparent from the above detailed description, a negative pressure change-over valve is provided in an intake pipe negative pressure introducing passage of the free wheel hub mechanism to not only open or close the said passage but also open it to the atmosphere, and a timer means is used to operate the negative pressure change-over valve so that the negative pressure introducing passage is opened to the atmosphere after the lapse of a certain time from when the transfer switches over to two- or four-wheel drive until when the intake pipe negative pressure becomes constant. According to this construction, the intake pipe negative pressure acts on the negative pressure path in the free wheel hub mechanism only at the time of switch-over to two- or four-wheel drive, thus making it possible to diminish the burden on each sealing member, reduce the possibility of occurrence of such inconvenience as the entry of muddy water, and improve the durability of the free wheel hub mechanism.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In a four-wheel drive vehicle with free wheels including a transfer case having a switching mechanism for switch-over between two-wheel drive and four-wheel drive, and a free wheel hub mechanism for making each of drive-side wheels free by an intake pipe negative pressure in a two-wheel drive condition of said transfer is disposed between each of said drive-side wheels and a drive-side axle, said free wheel hub mechanism including a plurality of sealing members for maintaining a negative pressure path in a hermetically sealed condition, the improvement comprising a negative pressure introducing passage for introducing the intake pipe negative pressure into said free wheel hub mechanism and a negative pressure change-over valve for opening and closing said negative pressure introducing passage and for causing said negative pressure introducing passage to be open to the atmosphere, and a timer means to operate said negative pressure change-over valve in such a manner that said negative pressure introducing passage is opened to the atmosphere after the lapse of a certain time from when said transfer case switches over to two- or four-wheel drive until when the intake pipe negative pressure becomes constant, and said timer means operates said negative pressure change-over valve in such a manner that said negative pressure introducing passage is opened to the atmosphere when the condition of a certain level or higher intake pipe negative pressure has continued a certain period of time after turning on a vacuum switch provided in said negative pressure introducing passage.

2. A four-wheel drive vehicle with free wheels according to claim 1, wherein said timer means operates said negative pressure change-over valve in such a manner that said negative pressure introducing passage is opened to the atmosphere after the lapse of a certain time in the case where said vacuum switch does not operate for a period of said certain time.

3. In a four-wheel drive vehicle with free wheels wherein a transfer case having a switching mechanism for switch-over between two-wheel drive and four-wheel drive is provided, and a free wheel hub mechanism for making each of driven-side wheels free by an intake pipe negative pressure in a two-wheel drive condition of said transfer case is disposed between each of said driven-side wheels and a driven-side axle, said free wheel hub mechanism being provided with a plurality of sealing members for maintaining a negative pressure path in a hermetically sealed condition, the improvement comprising a negative pressure introducing passage for introducing the intake pipe negative pressure into said free wheel hub mechanism and a negative pressure change-over valve for opening and closing said negative pressure introducing passage and for causing said negative pressure introducing passage to be open to the atmosphere, and a control means having a timer to operate said negative pressure change-over valve in such a manner that said negative pressure introducing passage is opened to the atmosphere after the lapse of a certain time from when said transfer case switches over to two- or four-wheel drive until when the intake pipe negative pressure becomes constant, said control means detecting a two- or four-wheel drive condition of said transfer case just after start-up of an engine and performing an initial operation.

4. A four-wheel drive vehicle including a transfer case with a switching mechanism for switching between a two-wheel drive mode and a four-wheel drive mode, a drive shaft connected between said transfer case and a differential, a pair of driven axles each having one end connected to opposite sides of said differential, a pair of free wheel hub mechanisms each connected to the other ends of the driven axles and each connected to a driven side wheel for making each of said driven-side wheels in a free state when said vehicle is in said two-wheel drive mode and in a driven state when said vehicle is in said four-wheel drive mode, said free wheel hub mechanism being provided with a plurality of sealing members for maintaining a pressure path in a hermetically sealed condition, comprising:

at least one pressure introducing passage having one end connected to a source of negative pressure and another end connected to said free wheel hub mechanism for introducing an intake pipe negative pressure into said free wheel hub mechanism;

at least one pressure change-over valve connected to said pressure introducing passage for opening and closing said pressure introducing passage and for causing said pressure introducing passage to be opened to the atmosphere;

a timer means connected to said pressure change over valve and operable to switch said pressure change-over valve such that said pressure introducing passing is opened to the atmosphere after a first period of time, said first period of time occurring from when said transfer case switches over to two or four wheel drive until when the intake pipe pressure becomes constant so that the pressure is removed from said pressure introducing passage after said first period of time, and a control means for detecting said two or four wheel drive modes just after start-up of an engine.

5. A four-wheel drive vehicle according to claim 4, further including a pressure sensor disposed in said pressure introducing passage for sensing the pressure in said pressure introducing passage.

6. A four-wheel drive vehicle according to claim 4, wherein said pressure introducing passage is a two-wheel drive pressure introducing passage.

7. A four-wheel drive vehicle according to claim 4, wherein said pressure introducing passage is a four-wheel drive pressure introducing passage.

8. A four-wheel drive vehicle according to claim 4, wherein said pressure change over valve is a two-wheel drive pressure change over valve.

9. A four-wheel drive vehicle according to claim 4, wherein said pressure change over valve is a four-wheel drive pressure change over valve.

10. A four-wheel drive vehicle according to claim 4, further including a vacuum switch connected to said pressure introducing passage between said pressure change-over valve and said free wheel hub mechanism for sensing when said vehicle is in said four wheel drive mode.

11. A four-wheel drive vehicle according to claim 4, wherein said free wheel hub mechanism includes a housing, a slide gear disposed in said housing and a magnet attached to said housing, said magnet operable to hold said slide gear adjacent said housing when said vehicle is in said two-wheel drive mode.

12. A four-wheel drive vehicle according to claim 4, wherein said free wheel hub mechanism includes a housing, a slide gear disposed in said housing and a spring disposed between said housing and said slide gear, said spring operable to urge said slide gear away from said housing when said slide gear is in said four-wheel drive mode.

* * * * *